United States Patent Office 2,731,351
Patented Jan. 17, 1956

2,731,351

SOUP CONCENTRATES

Murray M. Scharf, Green Bay, Wis., assignor of fifty per cent to Bernard Greenblatt, Chicago, Ill.

No Drawing. Application March 19, 1953,
Serial No. 343,528

16 Claims. (Cl. 99—124)

My invention relates to the preparation of soup concentrates which are adapted, upon the addition of water, to form soups for human consumption. The invention is especially concerned with the preparation of the product familiarly known as borsht, especially beet borsht.

Beet borsht, as commonly prepared, comprises a mixture of beets, sugar, salt, citric acid, and, occasionally, sour cream. In the preparation of packaged borsht products, the beets are cooked, peeled, shredded or diced, mixed with sugar, salt and citric acid, and the resulting mixture is bottled hot followed by hermetic sealing. The resulting hermetically sealed product is then heat processed, usually by heating the product in glass containers in water at a temperature of about 185 degrees F. for about 15 minutes after which the product is cooled. If the product can be filled very hot into containers, then the pasteurization or sterilizing treatment may not be necessary although the best standard practice is to heat after sealing as described above. Such products, while in widespread use, have a number of objections. In the first place, they contain a substantial content of water, since they constitute a finished product, and, therefore, they are very expensive to ship. In the next place, their color leaves much to be desired since, in the preparation thereof, the color of the beets deteriorates in the cooking process, and, moreover, after passage of extended periods of time as, for instance, when such commercial products lie on the shelves in grocery stores or the like, they acquire an objectionable brown color so that they lose their consumer appeal, and it is not uncommon for the storekeeper to return such products to the manufacturer because of their unappetizing appearance, and, therefore, lack of appeal to the purchasing public.

In accordance with my present invention, certain types of novel soup concentrates, particularly beet borsht concentrates, have been evolved which, upon the addition of water, are converted into ready to eat soups. These concentrates have a number of significant advantages over existing products. There is, in the first place, the obvious advantage of substantial saving in shipping costs, the cost of shipping the packaged concentrated products of my present invention being approximately one-fifth of the cost of shipment of present commercial packaged borsht products. A particularly important advantage of products produced in accordance with my present invention is that they can be packed cold and will retain their color and flavor over extended periods of time and will not deteriorate despite their not having been pasteurized or heat sterilized. Indeed, products made in accordance with my invention require no sterilization whatever because their keeping properties are excellent.

The manner of preparing the concentrated soup products of my present invention will be described below in detail with particular reference to the production of beet borsht concentrates. Vegetables other than beets can be utilized in the preparation of the concentrated soups as, for example, spinach, carrots, corn, string beans, peas and the like, and mixtures of such and other vegetables. However, as stated, the invention finds its greatest value in the preparation of beet borsht concentrates in which case the vegetable utilized will be beets or beets in admixture with other vegetables such as spinach, carrots, etc.

In the preparation of the beet borsht, the fresh beets are cooked in any conventional manner as, for example, in water or in pressure cookers. If cooked in water, the excess water is drained off. The cooked beets are then preferably sliced, shredded, diced or otherwise subdivided. There is then admixed with the resulting cooked and shredded or otherwise subdivided beets a dehydrated beet powder which has been prepared from raw or uncooked beets; sugar; salt; and, preferably a small proportion of citric acid. Sour cream and/or other optional ingredients can be added, if desired. The salt and sugar are utilized in proportions of substantial magnitude, particularly advantageously in amounts sufficient to dissolve in the water present in the cooked beets so as to make a strong, particularly a substantially concentrated, solution of the sugar and salt in said water. The raw or uncooked beet powder imparts exceptional coloring to the finished product and it also imparts a highly delectable flavor. While it is desirable that citric acid be added, its inclusion is not necessary. The other ingredients, however, namely, the sugar, salt, cooked vegetable and uncooked vegetable powder, comprise essential ingredients of the composition.

The proportions of the various essential ingredients of my soup concentrates will fall into the category, usually, of the following: sugar, about 30 to about 65; salt, about 5 to about 10; cooked vegetable (containing an amount of water usually present in the cooked vegetable after draining off the excess water), about 25 to about 65; and raw or uncooked vegetable powder, about 2 to about 6; all of the said parts being by weight. Where citric acid is incorporated into the composition, it will range in amounts up to about 1.5, usually from about 0.7 to about 1.5, again in reference to parts by weight. A more particularly preferred composition will contain sugar in the range of 40 to 60; salt 6 to 10; cooked vegetable, particularly beets, 30 to 40; and uncooked vegetable powder 2 to 4. In its especially preferred embodiments, the borsht concentrates will contain from about 55% to about 60% of sugar, from about 6% to about 8% of salt, and the balance will comprise mainly at least one cooked vegetable, and at least one uncooked vegetable powder, the cooked vegetable comprising entirely or predominately beets and being present in proportions largely exceeding the proportions of the uncooked vegetable or beet powder. The sugar and salt together should comprise not substantially less than 40%, by weight of the concentrate, and the salt should be present in substantially lesser proportions than the sugar but not substantially less than 5%, by weight of the concentrate.

The following examples are illustrative of specific compositions falling within the scope of my invention. It will be understood, of course, that numerous variations are possible, all falling within the scope of my invention in the light of the guiding principles which I disclose herein. Thus, for instance, the proportions are subject to certain modifications, various vegetables and mixtures of vegetables may be used, and supplemental flavoring and/or other ingredients may be incorporated, if desired, without departing from the principles and teachings contained herein.

[Parts are by weight of finished concentrate]

| Example | Sugar | Salt | Cooked Vegetable | Uncooked Vegetable Powder | Citric Acid | Sour Cream |
|---|---|---|---|---|---|---|
| 1 | 56 | 7 | 33 (Beet) | 2.3 (Beet) | 0.7 | |
| 2 | 30 | 10 | 55 (Beet) | 4 (Beet) | 1.0 | |
| 3 | 45 | 8 | 37 (Beet) / 5 (Spinach) | 3 (Beet) | 1.2 | 3 |
| 4 | 50 | 7.5 | 35 (Beet) / 5 (Spinach) | do | | |
| 5 | 40 | 9 | 47 (Spinach) | 3 (Spinach) | 1.0 | |
| 6 | 60 | 6 | 30 (Beet) | 2 (Beet) | 1.0 | 4 |
| 7 | 65 | 5 | 28 (Beet) | do | 0.8 | |
| 8 | 55 | 7 | 35 (Carrot) | 2.5 (Carrot) | 0.7 | |
| 9 | 60 | 7 | 28 (Beet) / 3 (Green Beans) | 2 (Beet) | 0.7 | |
| 10 | 50 | 8 | 32 (Beet) / 5 (Spinach) / 2 (Corn) | 3 (Beet) | | |

As has been indicated above, the finished product, namely, the concentrate, can be and advantageously is cold packed so that it is unnecessary to resort to the time consuming and relatively expensive practice of heat sterilization or pasteurization and, in addition, the avoidance of treatments which adversely affect the color of the finished product is achieved.

In the use of the concentrate, a five ounce quantity thereof, for instance, is admixed with a suitable quantity of water, for example, about a quart, so as to make a soup of desired character. The soup can be served cold or, if desired, it can be heated and served hot. Also, as has been indicated above, sour cream or other additions may be made to the finished soup.

It will be understood, as has been indicated above, that, in place of beets, or in admixture therewith, various other vegetables may be utilized. In those cases, for example, where the soup concentrate is that of a vegetable other than beets as for instance spinach, raw or uncooked spinach powder can be utilized as the uncooked vegetable powder. Furthermore, it will be appreciated that mixtures of various raw or uncooked vegetable powders can be utilized in admixture with one or more cooked vegetables, thus making it possible to prepare compositions having a wide variety of delectable tastes and flavors.

Where reference is made herein to cooked vegetables, it will be understood that it is intended to encompass cooked vegetables whether the same be fresh, frozen, canned, or, for that matter, dehydrated. However, it is particularly desirable that the cooked vegetable component of the concentrate be prepared from fresh vegetables. Where reference is made in the claims, as well as throughout the present specification, to proportions of the cooked vegetable or vegetables, it will be understood that said proportions include the vegetable containing substantially that amount of water which would normally be present therein after the cooking operation. The raw or uncooked vegetable powder is prepared by dehydrating a raw or fresh and uncooked vegetable followed by subdividing it or grinding it into powder form. It will be appreciated, however, that the raw vegetable material can be subdivided into the form of particles larger than what may strictly be called a powder. In any event, the raw or uncooked dehydrated vegetable will be utilized in the form of pulverulent particles which, for convenience, are denoted by the term "powder."

What I claim as new and desire to protect by Letters Patent of the United States is:

1. A concentrate having the property of retaining its color and flavor appreciably unimpaired over substantial periods of time and adapted upon the addition of water to form a soup, said concentrate containing, as essential ingredients, sugar, salt, cooked vegetable, and uncooked vegetable powder, the sugar and salt together comprising not substantially less than 40%, by weight of said concentrate, and the salt being present in substantially lesser proportions than the sugar but not substantially less than 5%, by weight of said concentrate, the cooked vegetable being present in proportions largely exceeding the proportions of the uncooked vegetable powder.

2. A borsht concentrate having the property of retaining its color and flavor appreciably unimpaired over substantial periods of time and adapted upon the addition of water to form borsht, said concentrate containing, as essential ingredients, sugar, salt, cooked subdivided beets, and uncooked beet powder, the sugar and salt together comprising not substantially less than 40%, by weight of said concentrate, and the salt being present in substantially lesser proportions than the sugar but not substantially less than 5%, by weight of said concentrate, the cooked subdivided beets being present in proportions largely exceeding the proportions of the uncooked beet powder.

3. A concentrate, adapted upon the addition of water to form a soup, said concentrate containing, by weight, from about 30% to about 65% sugar, from about 5% to about 10% salt, and the balance comprising mainly cooked vegetable and uncooked vegetable powder, the cooked vegetable being present in proportions largely exceeding the proportions of the uncooked vegetable powder.

4. A borsht concentrate, adapted upon the addition of water to form borsht, said concentrate containing, by weight, from about 30% to about 65% sugar, from about 5% to about 10% salt, and the balance comprising mainly cooked beets and uncooked beet powder, the cooked beets being present in proportions largely exceeding the proportions of the uncooked beet powder.

5. A borsht concentrate, adapted upon the addition of water to form borsht, said concentrate containing, by weight, from about 55% to about 60% sugar, from about 6% to about 8% salt, and the balance comprising mainly cooked beets and uncooked beet powder, the cooked beets being present in proportions largely exceeding the proportions of the uncooked beet powder.

6. A borsht concentrate, adapted upon the addition of water to form borsht, said concentrate containing, by weight, from about 30% to about 65% sugar, from about 5% to about 10% salt, up to about 1.5% citric acid, and the balance comprising mainly cooked beets and uncooked beet powder, the cooked beets being present in proportions largely exceeding the proportions of the uncooked beet powder.

7. A borsht concentrate, adapted upon the addition of water to form borsht, said concentrate containing, by weight, from about 30% to about 65% sugar, from about 5% to about 10% salt, and the balance comprising mainly at least one cooked vegetable and uncooked beet powder, the cooked vegetable comprising predominately beets, said cooked vegetable being present in proportions largely exceeding the proportions of the uncooked beet powder.

8. A borsht concentrate, adapted upon the addition of water to form borsht, said concentrate containing, by weight, from about 55% to about 60% sugar, from about 6% to about 8% salt, and the balance comprising mainly at least one cooked vegetable and uncooked beet powder, the cooked vegetable comprising predominately beets, said cooked vegetable being present in proportions largely exceeding the proportions of the uncooked beet powder.

9. A concentrate, adapted upon the addition of water to form a soup, said concentrate containing, as essential ingredients, the following in approximately the stated parts, by weight:

| | |
|---|---|
| Sugar | 30 to 65 |
| Salt | 5 to 10 |
| Cooked vegetable | 25 to 65 |
| Uncooked vegetable powder | 2 to 6 |

10. A borsht concentration, adapted upon the addition of water to form borsht, said concentrate containing, as essential ingredients, the following in approximately the stated parts, by weight:

| | |
|---|---|
| Sugar | 30 to 65 |
| Salt | 5 to 10 |
| Cooked beets | 25 to 65 |
| Uncooked beet powder | 2 to 6 |

11. A borsht concentrate, adapted upon the addition of water to form borsht, said concentrate containing, as essential ingredients, the following in approximately the stated parts, by weight:

| | |
|---|---|
| Sugar | 30 to 65 |
| Salt | 5 to 10 |
| Cooked beets | 25 to 65 |
| Uncooked beet powder | 2 to 6 |
| Citric acid | 0.7 to 1.5 |

12. A cold-packed borsht concentrate having the property of retaining its color and flavor appreciably unimpaired over substantial periods of time and adapted upon the addition of water to form borsht, said concentrate containing, as essential ingredients, the following in approximately the stated parts, by weight:

| | |
|---|---|
| Sugar | 30 to 65 |
| Salt | 5 to 10 |
| Cooked beets | 25 to 65 |
| Uncooked beet powder | 2 to 6 |

13. A cold-packed borsht concentrate having the property of retaining its color and flavor appreciably unimpaired over substantial periods of time and adapted upon the addition of water to form borsht, said concentrate containing, as essential ingredients, the following in approximately the stated parts, by weight:

| | |
|---|---|
| Sugar | 40 to 60 |
| Salt | 6 to 10 |
| Cooked beets | 30 to 40 |
| Uncooked beet powder | 2 to 4 |
| Citric acid | 0.7 to 1.5 |

14. A borsht concentrate, adapted upon the addition of water to form borsht, said concentrate containing, as essential ingredients, the following in approximately the stated parts, by weight:

| | |
|---|---|
| Sugar | 30 to 65 |
| Salt | 5 to 10 |
| Cooked vegetable comprising predominately beets | 25 to 65 |
| Uncooked beet powder | 2 to 6 |

15. A cold-packed concentrate having the property of retaining its color and flavor appreciably unimpaired over substantial periods of time and adapted upon the addition of water to form a soup, said concentrate containing, as essential ingredients, the following in approximately the stated parts, by weight:

| | |
|---|---|
| Sugar | 40 to 60 |
| Salt | 6 to 10 |
| Cooked subdivided vegetable | 30 to 40 |
| Uncooked vegetable powder | 2 to 6 |

16. A borsht concentrate having the property of retaining its color and flavor appreciably unimpaired over substantial periods of time and adapted upon the addition of water to form borsht, said concentrate containing, as essential ingredients, sugar, salt, cooked subdivided beets and uncooked beet powder, the sugar constituting from about 30% to about 65%, by weight of said concentrate, and the salt constituting from about 5% to about 10%, by weight of said concentrate, the sugar and salt being substantially entirely in solution in the water present in said cooked beets whereby to form a highly concentrated aqueous solution of sugar and salt, the cooked beets being present in proportions largely exceeding the proportions of the uncooked beet powder.

References Cited in the file of this patent

UNITED STATES PATENTS

| | | |
|---|---|---|
| 1,911,463 | Owen | May 30, 1933 |
| 2,079,649 | Allen | May 11, 1937 |
| 2,334,059 | Bauer et al. | Nov. 9, 1943 |

OTHER REFERENCES

"Everybody's Cookbook," by Lord, revised edition, Harcourt, Brace and Company, New York, pages 702 and 703.